US012548909B2

(12) United States Patent
Sakr et al.

(10) Patent No.: US 12,548,909 B2
(45) Date of Patent: Feb. 10, 2026

(54) DUAL-POLARIZED ANTENNAS WITH RING BALUN EXCITATION

(71) Applicant: Analog Devices International Unlimited Company, County Limerick (IE)

(72) Inventors: Ahmed Sakr, Cairo (EG); Islam A. Eshrah, Cairo (EG)

(73) Assignee: Analog Devices International Unlimited Company, County Limerick (IE)

( * ) Notice: Subject to any disclaimer, the term of this patent is extended or adjusted under 35 U.S.C. 154(b) by 122 days.

(21) Appl. No.: 18/671,078

(22) Filed: May 22, 2024

(65) Prior Publication Data

US 2025/0112372 A1 Apr. 3, 2025

Related U.S. Application Data

(60) Provisional application No. 63/586,154, filed on Sep. 28, 2023.

(51) Int. Cl.
*H01Q 9/04* (2006.01)
*H01P 1/00* (2006.01)

(52) U.S. Cl.
CPC ......... *H01Q 9/0457* (2013.01); *H01Q 9/0435* (2013.01); *H01Q 9/0478* (2013.01); *H01P 1/00* (2013.01)

(58) Field of Classification Search
CPC .. H01Q 9/0457; H01Q 9/0435; H01Q 9/0478; H01Q 1/38; H01Q 21/24; H01P 1/00
See application file for complete search history.

(56) References Cited

U.S. PATENT DOCUMENTS 6,300,920 B1 * 10/2001 Pertl ........................ H01Q 7/00 343/742
6,552,530 B1 * 4/2003 Vaiser ...................... H01Q 7/00 324/226

(Continued)

OTHER PUBLICATIONS

Mirmozafari et al., "Dual-Polarization Antennas with High Isolation and Polarization Purity: A Review and Comparison of Corss-Cupling Mechanisms," in IEEE Antennas and Propagation Magazine, vol. 61, No. 1, 50-63, Feb. 2019, doi: 10.1109/MAP.2018.2883032.

(Continued)

*Primary Examiner* — Regis J Betsch
*Assistant Examiner* — Jose A. Miranda Gonzalez
(74) *Attorney, Agent, or Firm* — Knobbe, Martens, Olson & Bear, LLP

(57) ABSTRACT

Dual-polarized antennas with ring balun excitation are disclosed. In certain embodiments, a dual-polarized antenna includes an antenna element and a ring balun for providing excitation of the antenna element. The ring balun includes conductive segments electrically connected in a ring, a first input port that receives a first single-ended RF signal of a first signal polarization, and a second input port that receives a second single-ended RF signal of a second signal polarization. The ring balun further includes a first output port and a second output port that collectively provide a first differential RF signal of the first signal polarization to the antenna element, and a third output port and a fourth output port that collectively provide a second differential RF signal of the second signal polarization to the antenna element.

20 Claims, 11 Drawing Sheets

(56) References Cited

U.S. PATENT DOCUMENTS

| | | | | |
|---|---|---|---|---|
| 6,822,614 | B2 * | 11/2004 | Chiu | H01Q 7/08<br>343/866 |
| 7,994,985 | B2 | 8/2011 | Luk et al. | |
| 11,177,567 | B2 | 11/2021 | Khalil et al. | |
| 11,444,376 | B2 | 9/2022 | Abdalla et al. | |
| 11,670,851 | B2 | 6/2023 | Kilpatrick et al. | |
| 11,870,156 | B2 | 1/2024 | Eshrah et al. | |
| 2018/0076523 | A1 * | 3/2018 | Rockway | H01Q 7/005 |
| 2018/0123231 | A1 * | 5/2018 | Peterson | H01Q 1/50 |
| 2021/0175639 | A1 * | 6/2021 | Wang | H01Q 1/38 |
| 2022/0092883 | A1 * | 3/2022 | He | G07B 15/00 |
| 2023/0155270 | A1 | 5/2023 | Sakr et al. | |
| 2023/0253709 | A1 | 8/2023 | Sakr et al. | |
| 2023/0261381 | A1 | 8/2023 | Hassan et al. | |
| 2023/0261392 | A1 | 8/2023 | Sakr et al. | |
| 2024/0055765 | A1 | 2/2024 | Sakr | |

OTHER PUBLICATIONS

Wang et al., "A high isolation dual-polarized microstrip patch antenna based on backed substrate integrated cavity and pins-loaded cross slot." Microwave and Optical Technology Letters 62.10 (2020): 3239-3247.

* cited by examiner

DUAL-POLARIZED ANTENNAS WITH RING BALUN EXCITATION

CROSS-REFERENCE TO RELATED APPLICATIONS

The present application claims priority to U.S. Provisional Patent Application No. 63/586,154, filed Sep. 28, 2023, and titled "DUAL-POLARIZED ANTENNAS WITH RING BALUN EXCITATION," the entirety of which is hereby incorporated herein by reference.

FIELD OF THE DISCLOSURE

Embodiments of the invention relate to electronic systems, and more particularly, to antennas for radio frequency (RF) communications.

BACKGROUND

Antennas can be used in a wide variety of applications to transmit and/or receive radio frequency (RF) signals. Example applications using antennas include radar, satellite, military, and/or cellular communications.

SUMMARY OF THE DISCLOSURE

Dual-polarized antennas with ring balun excitation are disclosed. In certain embodiments, a dual-polarized antenna includes an antenna element and a ring balun for providing excitation of the antenna element. The ring balun includes conductive segments electrically connected in a ring, a first input port that receives a first single-ended RF signal of a first signal polarization, and a second input port that receives a second single-ended RF signal of a second signal polarization. The ring balun further includes a first output port and a second output port that collectively provide a first differential RF signal of the first signal polarization to the antenna element, and a third output port and a fourth output port that collectively provide a second differential RF signal of the second signal polarization to the antenna element. By implementing the antenna in this manner, the antenna can provide high isolation for dual-polarized antenna designs. Furthermore, the antenna includes a compact balun design that renders the antenna suitable for use in a phased array communication system operating with beamforming. Moreover, the compact design for the balun and/or antenna element are also manufacturable using printed circuit board (PCB) technologies. Accordingly, the antennas can be arranged in an array configuration desired for a particular application, such as advanced cellular systems.

In one aspect, an antenna includes a first input signal feed configured to receive a first single-ended RF signal of a first signal polarization, a second input signal feed configured to receive a second single-ended RF signal of a second signal polarization, and a ring balun including a plurality of conductive segments electrically connected in a ring. The ring balun has a first input port configured to receive the first single-ended RF signal from the first input signal feed, a second input port configured to receive the second single-ended RF signal from the second input signal feed, a first output port and a second output port configured to output a first differential RF signal of the first signal polarization, and a third output port and a fourth output port configured to output a second differential RF signal of the second signal polarization. The antenna further includes an antenna element coupled to the first output port, the second output port, the third output port, and the fourth output port.

In another aspect, a printed circuit board is patterned to form an antenna. The printed circuit board includes a first input signal feed formed in a first conductive layer of the printed circuit board, the first input signal feed configured to receive a first single-ended RF signal of a first signal polarization. The printed circuit board further includes a second input signal feed formed in the first conductive layer of the printed circuit board, the second input signal feed configured to receive a second single-ended RF signal of a second signal polarization. The printed circuit board further includes a ring balun formed in the first conductive layer of the printed circuit board, the ring balun including a plurality of conductive segments electrically connected in a ring, the ring balun having a first input port configured to receive the first single-ended RF signal from the first input signal feed, a second input port configured to receive the second single-ended RF signal from the second input signal feed, a first output port and a second output port configured to output a first differential RF signal of the first signal polarization, and a third output port and a fourth output port configured to output a second differential RF signal of the second signal polarization. The printed circuit board further includes an antenna element formed in a second conductive layer of the printed circuit board, the antenna element coupled to the first output port, the second output port, the third output port, and the fourth output port.

In another aspect, a method of forming an antenna is disclosed. The method includes forming a first input signal feed in a first conductive layer of a printed circuit board, the first input signal feed configured to receive a first single-ended radio frequency (RF) signal of a first signal polarization. The method further includes forming a second input signal feed in the first conductive layer of the printed circuit board, the second input signal feed configured to receive a second single-ended RF signal of a second signal polarization. The method further includes forming a ring balun in the first conductive layer of the printed circuit board, the ring balun including a plurality of conductive segments electrically connected in a ring, the ring balun having a first input port configured to receive the first single-ended RF signal from the first input signal feed, a second input port configured to receive the second single-ended RF signal from the second input signal feed, a first output port and a second output port configured to output a first differential RF signal of the first signal polarization, and a third output port and a fourth output port configured to output a second differential RF signal of the second signal polarization. The method further includes forming an antenna element in a second conductive layer of the printed circuit board, the antenna element coupled to the first output port, the second output port, the third output port, and the fourth output port.

DETAILED DESCRIPTION OF EMBODIMENTS

The following detailed description of embodiments presents various descriptions of specific embodiments of the invention. However, the invention can be embodied in a multitude of different ways. In this description, reference is made to the drawings. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Figure 1:
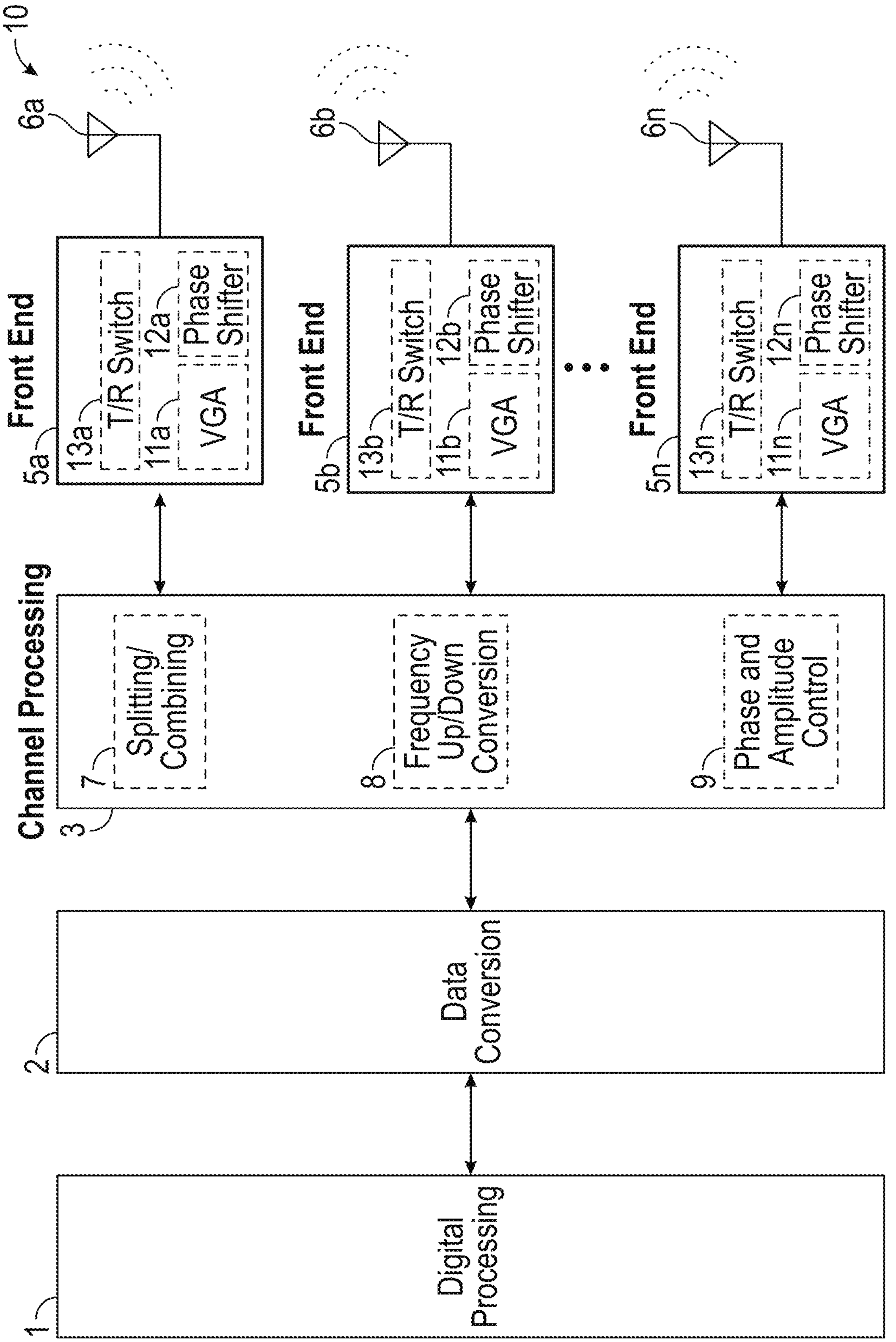
FIG. 1 is a schematic diagram of one embodiment of a phased array antenna system.

FIG. 1 is a schematic diagram of one embodiment of a phased array antenna system 10. The phased array antenna system 10 includes a digital processing circuit 1, a data conversion circuit 2, a channel processing circuit 3, RF front ends 5*a*, 5*b*, . . . 5*n*, and an antenna array that includes antennas 6*a*, 6*b*, . . . 6*n*. Although an example system with three RF front ends and three antennas is illustrated, the phased array antenna system 10 can include more or fewer RF front ends and/or more or fewer antennas as indicated by the ellipses. Furthermore, in certain implementations, the phased array antenna system 10 is implemented with separate antennas for transmitting and receiving signals.

The phased array antenna system 10 illustrates one embodiment of an electronic system that can include one or more antennas implemented in accordance with the teachings herein. However, the antennas disclosed herein can be used in a wide range of electronics. A phased array antenna system is also referred to herein as an active scanned electronically steered array (AESA) or beamforming communication system.

As shown in FIG. 1, the channel processing circuit 3 is coupled to antennas 6*a*, 6*b*, . . . 6*n* through RF front ends 5*a*, 5*b*, . . . 5*n*, respectively. The channel processing circuit 3 includes a splitting/combining circuit 7, a frequency up/down conversion circuit 8, and a phase and amplitude control circuit 9, in this embodiment. The channel processing circuit 3 provides RF signal processing of RF signals transmitted by and received from each communication channel. In the illustrated embodiment, each communication channel is associated with a corresponding RF front end and antenna. However, other implementations are possible.

With continuing reference to FIG. 1, the digital processing circuit 1 generates digital transmit data for controlling a transmit beam radiated from the antennas 6*a*, 6*b*, . . . 6*n* of the antenna array. The digital processing circuit 1 also processes digital receive data representing a receive beam received by the antennas 6*a*, 6*b*, . . . 6*n* of the antenna array. In certain implementations, the digital processing circuit 1 includes one or more baseband processors.

As shown in FIG. 1, the digital processing circuit 1 is coupled to the data conversion circuit 2, which can include digital-to-analog converter (DAC) circuitry for converting digital transmit data to one or more baseband transmit signals and analog-to-digital converter (ADC) circuitry for converting one or more baseband receive signals to digital receive data.

The frequency up/down conversion circuit 8 provides frequency upshifting from baseband to RF and frequency downshifting from RF to baseband, in this embodiment. However, other implementations are possible, such as configurations in which the phased array antenna system 10 operates in part at an intermediate frequency (IF) or in which RF data converters provide direct conversion between digital and RF. In certain implementations, the splitting/combining circuit 7 provides splitting to one or more frequency upshifted transmit signals to generate RF signals suitable for processing by the RF front ends 5*a*, 5*b*, . . . 5*n* and subsequent transmission on the antennas 6*a*, 6*b*, . . . 6*n*. Additionally, the splitting/combining circuit 7 combines RF signals received vias the antennas 6*a*, 6*b*, . . . 6*n* and RF front ends 5*a*, 5*b*, . . . 5*n* to generate one or more baseband receive signals for the data conversion circuit 2.

The channel processing circuit 3 also includes the phase and amplitude control circuit 9 for controlling beamforming operations. For example, the phase and amplitude control circuit 9 controls the amplitudes and phases of RF signals transmitted or received via the antennas 6*a*, 6*b*, . . . 6*n* to provide beamforming.

With respect to signal transmission, the RF signals radiated from the antennas 6*a*, 6*b*, . . . 6*n* aggregate through constructive and destructive interference to collectively generate a transmit beam having a particular direction. With respect to signal reception, the channel processing circuit 3 generates a receive beam by combining the RF signals received from the antennas 6*a*, 6*b*, . . . 6*n* after amplitude scaling and phase shifting.

Phased array antenna systems are used in a wide variety of applications including, but not limited to, mobile communications, military and defense systems, and/or radar technology.

As shown in FIG. 1, the RF front ends 5*a*, 5*b*, . . . 5*n* each include one or more VGAs 11*a*, 11*b*, . . . 11*n*, which are used to scale the amplitude of RF signals transmitted or received by the antennas 6*a*, 6*b*, . . . 6*n*, respectively. Additionally, the RF front ends 5*a*, 5*b*, . . . 5*n* each include one or more phase shifters 12*a*, 12*b*, . . . 12*n*, respectively, for phase-shifting the RF signals. For example, in certain implementations, the phase and amplitude control circuit 9 generates gain control signals for controlling the amount of gain provided by the VGAs 11*a*, 11*b*, . . . 11*n* and phase control signals for controlling the amount of phase shifting provided by the phase shifters 12*a*, 12*b*, . . . 12*n*. Furthermore, the RF front ends 5*a*, 5*b*, . . . 5*n* each include one or more transmit/receive (T/R) switches 13*a*, 13*b*, . . . 13*b* for controlling access of transmit and receive circuitry to the antennas 6*a*, 6*b*, . . . 6*n*.

The phased array antenna system 10 operates to generate a transmit beam and/or receive beam including a main lobe pointed in a desired direction of communication. The phased array antenna system 10 realizes increased signal to noise (SNR) ratio in the direction of the main lobe. The transmit beam and/or receive beam also includes one or more side lobes, which point in different directions than the main lobe and are undesirable.

An accuracy of beam direction of the phased array antenna system 10 is based on a precision in controlling the gain and phases of the RF signals communicated via the antennas 6*a*, 6*b*, . . . 6*n*. For example, when one or more of the RF signals has a large phase error, the beam can be broken and/or pointed in an incorrect direction. Furthermore, the size or magnitude of beam side lobe levels is based on an accuracy in controlling the phases and amplitudes of the RF signals.

Accordingly, it is desirable to tightly control the phase and amplitude of RF signals communicated by the antennas 6*a*, 6*b*, . . . 6*n* to provide robust beamforming operations.

Although the phased array antenna system 10 of FIG. 1 depicts one example of an RF communication system that can include one or more antennas, the teachings herein are also applicable to other types of RF communication systems.

Figure 2A:
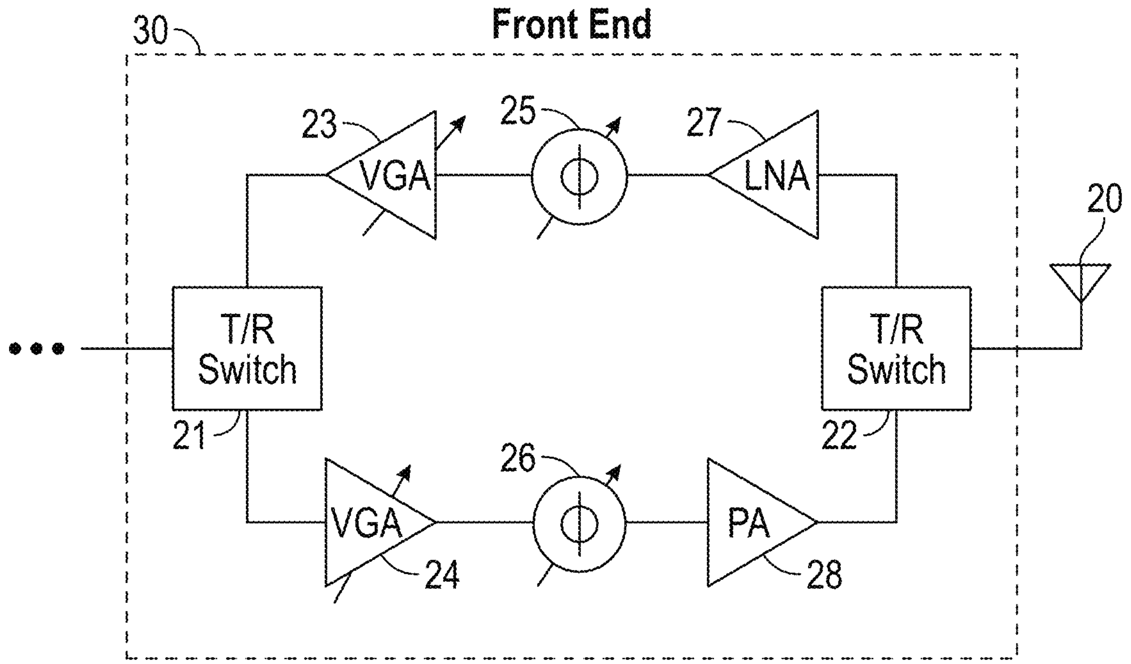
FIG. 2A is a schematic diagram of one embodiment of a front end system.

FIG. 2A is a schematic diagram of one embodiment of a front end system 30. The front end system 30 includes a first transmit/receive (T/R) switch 21, a second transmit/receive switch 22, a receive-path VGA 23, a transmit-path VGA 24, a receive-path controllable phase shifter 25, a transmit-path phase shifter 26, a low noise amplifier (LNA) 27, and a power amplifier (PA) 28. As shown in FIG. 2A, the front end system 30 is depicted as being coupled to an antenna 20, which can correspond to one antenna of an antenna array.

Although FIG. 2A depicts one example of a front end system that can transmit and receive RF signals, the antennas herein can operate in combination with a wide variety of types of RF front ends. Accordingly, other implementations are possible. Furthermore, although circuitry for one polarization, all or part of the depicted circuitry can be duplicated to provide components for handling multiple signal polarizations.

The front end system 30 can be included in a wide variety of RF systems, including, but not limited to, phased array antenna systems, such as the phased array antenna system 10 of FIG. 1. For example, multiple instantiations of the front end system 30 can be used to implement the RF front ends 5*a*, 5*b*, . . . 5*n* of FIG. 1. In certain implementations, one or more instantiations of the front end system 30 are fabricated on a semiconductor die or chip.

As shown in FIG. 2A, the front end system 30 includes the receive-path VGA 23 for controlling an amount of amplification provided to an RF input signal received on the antenna 20, and the transmit-path VGA 24 for controlling an amount of amplification provided to an RF output signal transmitted on the antenna 20. Additionally, the front end system 30 includes the receive-path controllable phase shifter 25 for controlling an amount of phase shift to an RF input signal received on the antenna 20, and the transmit-path controllable phase shifter 26 for controlling an amount of phase shift provided to the RF output signal transmitted on the antenna 20.

The gain control provided by the VGAs and the phase control provided by the phase shifters can serve a wide variety of purposes including, but not limited to, compensating for temperature and/or process variation. Moreover, in beamforming applications, the VGAs and phase shifters can control side-lobe levels of a beam pattern.

Figure 2B:
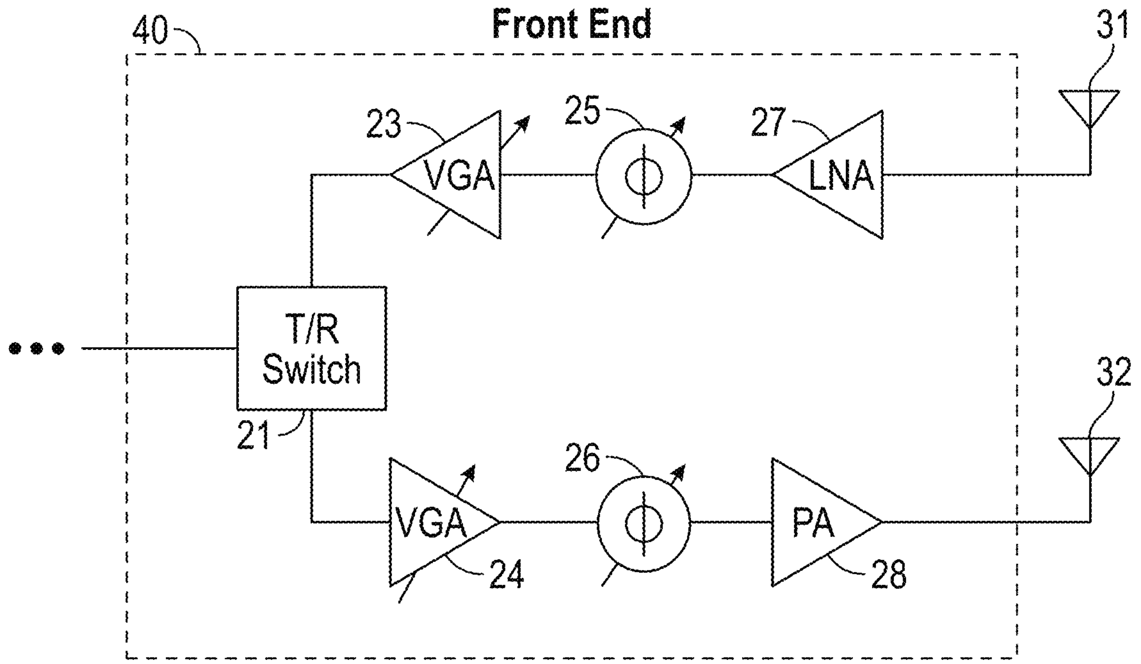
FIG. 2B is a schematic diagram of another embodiment of a front end system.

FIG. 2B is a schematic diagram of another embodiment of a front end system 40. The front end system 40 of FIG. 2B is similar to the front end system 30 of FIG. 2A, except that the front end system 40 omits the second transmit/receive switch 22. As shown in FIG. 2B, the front end system 40 is depicted as being coupled to a receive antenna 31 and to a transmit antenna 32.

The receive antenna 31 and/or the transmit antenna 32 can be implemented in accordance with any of the embodiments herein. Although FIG. 2B depicts another example of a front end system that can transmit and receive RF signals on antennas, the antennas herein can operate in combination with a wide variety of types of RF front ends. Accordingly, other implementations are possible.

The front end system 40 operates with different antennas for signal transmission and reception. In the illustrated embodiment, the receive-path VGA 23 controls an amount of amplification provided to an RF input signal received on the receive antenna 31, and the transmit-path VGA 24 controls an amount of amplification provided to an RF output signal transmitted on the second antenna 32. Additionally, the receive-path phase shifter 25 controls an amount of phase shift provided to the RF input signal received on the receive antenna 31, and the transmit-path phase shifter 26 controls an amount of phase shift provided to an RF output signal transmitted on the second antenna 32.

Examples of Dual-Polarized Antennas with Ring Balun Excitation

An antenna array can include an array of antennas placed in a two-dimensional arrangement and spaced in a manner to direct radiation in a specific direction. The directed beam can be normal to a plane containing the antenna array or can be titled at a specific angle. For example, antenna arrays with down-tilted beams are attractive for high altitude applications such as base-station towers, indoor access points, and/or roof top communications equipment.

The directed beam from an antenna array has a beam angle that can be controlled by the phase shifts among antennas of the antenna array. Such phase shifts are provided by phase shifters that can be fabricated on one or more beamformer integrated circuits (ICs) or chips that feed the antenna array. For example, the RF signals radiated from the antennas of an array combine through constructive and destructive interference to collectively generate a transmit beam having a particular direction.

Antenna arrays suffer from high coupling among adjacent antennas within the antenna array. High coupling causes the impedance to be highly dependent on the phases given to the antennas by the phase shifters, which makes the array performance degrade with increasing scanning angle.

Having high coupling among the antennas limits the possibility of transmitting and/or receiving multiple data streams on the same millimeter wave (mm-wave) circuit board, which is desired for certain applications, such as sixth generation (6G) cellular communications.

Dual-polarized antennas can include a first port for a first signal polarization and a second port for a second signal polarization. A polarization of an electromagnetic wave refers to a behavior of the wave's electric field vector over time. For example, an electromagnetic wave with a linear electric field vector is referred to as a linearly polarized wave, while an electromagnetic wave with a generally circular electric field vector is referred to as a circularly polarized wave. Linear polarization includes vertical polarization and horizontal polarization, which are orthogonal to one another. Circular polarization includes a right-hand circular polarization (RHCP) and a left-hand circular polarization (LHCP), which are orthogonal to one another.

When dual-polarized antennas are arranged in an array, one type of coupling mechanism is co-polarization (co-pol) coupling, which arises from coupling between the same polarization ports of the antennas. In one example, co-pol coupling arises from coupling from one horizontally polarized port to another horizontally polarized port, as well as from one vertically polarized port to another vertically polarized port.

Another type of coupling mechanism is cross-polarization (X-pol) coupling, which arises from coupling between the opposite polarization ports of the antennas. In one example, X-pol coupling arises from coupling from one horizontally polarized port to a vertically polarized port, as well as from one vertically polarized port to a horizontally polarized port.

Coupling between polarizations in dual-polarized systems has various detrimental effects on system performance. For example, coupling causes the antenna impedance to vary depending on the relative magnitude and phase between the polarizations. The variation in antenna impedance results in load-pulling of the power amplifiers driving the array as the impedance varies for different beam positions under element phasing. Furthermore, coupling causes the over-the-air (OTA) cross-polarization discrimination (XPD) to be low, which reduces signal-to-noise ratio (SNR) and limits the available type of modulation scheme.

Figure 3A:
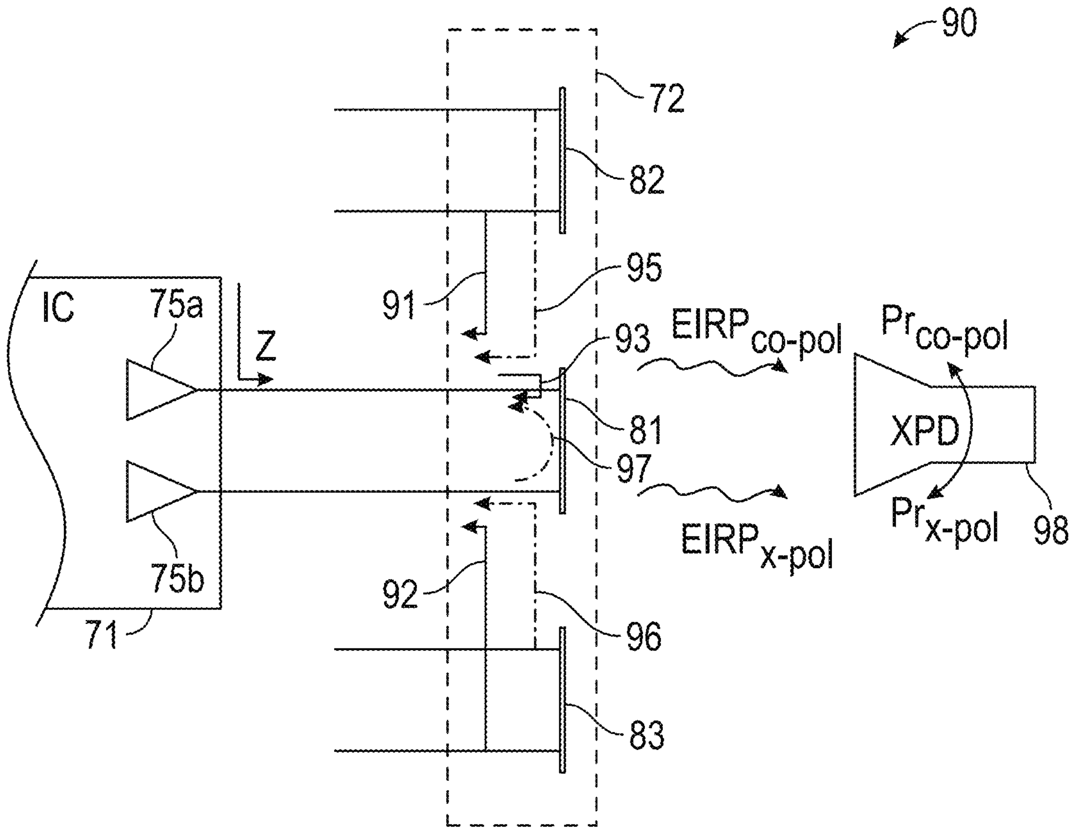
FIG. 3A is a schematic diagram depicting one example of coupling in a phased array antenna system.

FIG. 3A is a schematic diagram depicting one example of coupling in a phased array antenna system 90. The phased array antenna system 90 includes a beamforming IC 71 that drives a dual-polarized antenna 81 of an antenna array 72. The beamforming IC 71 includes a first power amplifier 75*a* for driving a first signal port of the dual-polarized antenna 81 and a second power amplifier 75*b* for driving a second signal port of the dual-polarized antenna 81. The first and second signal ports of the dual-polarized antenna 81 have different signal polarizations (for instance, vertical and horizontal or RHCP and LHCP).

As shown in FIG. 3A, the antenna array 72 further includes a first adjacent antenna 82 on a first side of the dual-polarized antenna 81 and a second adjacent antenna 83 on a second side of the dual-polarized antenna 81. Additionally, FIG. 3A has been annotated to show examples of Co-pol coupling 91/92/93 between ports of the same polarization and X-pol coupling 95/96/97 between ports of different polarization.

X-pol coupling is deterministic per beam position and can be accounted for in the design and should not cause SNR degradation. However, X-pol coupling is random and cannot be accounted for in the design unless sufficiently low. The main limiting factor in X-pol coupling can be the X-pol self-coupling 97 between the two orthogonal polarization ports of the same antenna.

Coupling can cause an impedance Z seen by the power amplifiers 75*a*/75*b* to change with random variation due to X-pol coupling. The OTA XPD 98 can degrade the SNR when both polarizations are ON as compared to when only one polarization is ON.

Figure 3B:
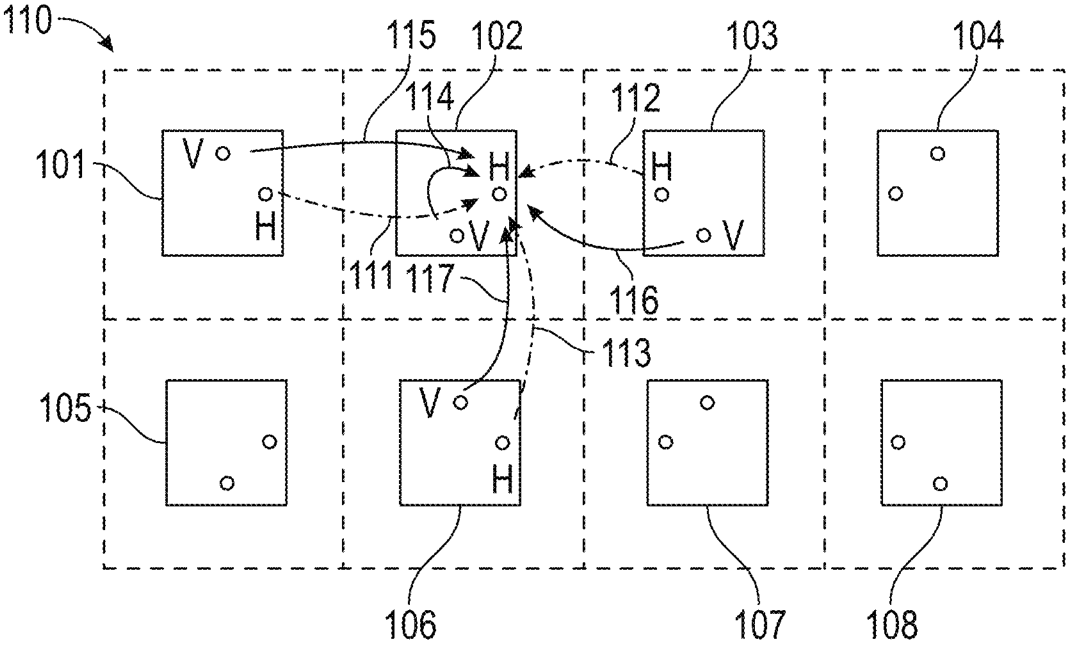
FIG. 3B is a schematic diagram depicting another example of coupling between antenna elements of an antenna array.

FIG. 3B is a schematic diagram depicting another example of coupling between antenna elements of an antenna array 110. As shown in FIG. 3, the antenna array 110 includes patch antenna elements arranged in a two-by-four (2×4) array. The antenna array 110 includes a top row including a first patch antenna element 101, a second patch antenna element 102, a third patch antenna element 103, and a fourth patch antenna element 104. Additionally, the antenna array 110 includes a bottom row including a fifth patch antenna element 105, a sixth patch antenna element 106, a seventh patch antenna element 107, and an eighth patch antenna element 108. Each of the patch antenna elements 101-108 is dual-polarized and includes a horizontally polarized port (H port) for handling a horizontally polarized signal and a vertically polarized port (V port) for handling a vertically polarized signal, in this example.

The diagram depicts examples of coupling with respect to the second patch antenna element 102. Although annotations for coupling are shown for the second patch antenna element 102, each of the depicted patch antenna elements suffers from coupling. Furthermore, additional coupling mechanisms exist beyond those that are annotated. Thus, the depicted coupling mechanisms are shown for exemplary purposes only.

As shown in FIG. 3B, three examples of co-pol coupling are shown, including co-pol coupling 111 from the H port of the first patch antenna element 101 to the H port of the second patch antenna element 102, co-pol coupling 112 from the H port of the third patch antenna element 103 to the H port of the second patch antenna element 102, and co-pol coupling 113 from the H port of the sixth patch antenna element 106 to the H port of the second patch antenna element 102. Co-pol coupling arises between antenna elements within the same row as well as from antenna elements in different rows.

With continuing reference to FIG. 3B, four examples of X-pol coupling are shown, including X-pol coupling 114 from the V port of the second patch antenna element 102 to the H port of the second patch antenna element 102, X-pol coupling 115 from the V port of the first patch antenna element 101 to the H port of the second patch antenna element 102, X-pol coupling 116 from the V port of the third patch antenna element 103 to the H port of the second patch antenna element 102, and X-pol coupling 117 from the V port of the sixth patch antenna element 106 to the H port of the second patch antenna element 102. X-pol coupling arises between antenna elements within the same row as well as from antenna elements in other rows. Furthermore, X-pol coupling arises between different types of ports of the same antenna element as well as from different types of ports of different antenna elements.

Not only do antennas of a typical antenna array suffer from high coupling, but the amount of coupling is also a function of beam position. For example, high coupling causes the impedance to be very dependent on the phases given to the antennas by the phase shifters, which makes the array performance degrade with increasing scanning angle.

There is a need for addressing coupling issues that arise in an antenna array of dual-polarized antennas.

In certain embodiments herein, an antenna includes an antenna element and a ring balun for providing excitation of the antenna element. The ring balun includes conductive segments electrically connected in a ring, a first input port that receives a first single-ended RF signal of a first signal polarization, and a second input port that receives a second single-ended RF signal of a second signal polarization. The ring balun further includes a first output port and a second output port that collectively provide a first differential RF signal of the first signal polarization to the antenna element, and a third output port and a fourth output port that collectively provide a second differential RF signal of the second signal polarization to the antenna element.

Thus, the ring balun can serve as a dual-balun based on a 6-port ring coupler. The ring balun structure receives single-ended RF signals of two different signal polarizations, such as vertical and horizontal polarizations or RHCP and LHCP polarizations. Additionally, the ring balun structure feeds (for example, parasitically couples) differential RF signals of each signal polarization to the antenna element.

By implementing the antenna in this manner, the antenna can provide high isolation for dual-polarized antenna designs. Furthermore, for applications using RHCP and LCHP polarizations, with proper signal delay (for instance, about 90° between the RF input signals) the antenna configuration can provide circular polarization with high axial ratio, which is a measure of imperfection of a circularly polarized antenna.

Furthermore, the antenna includes a compact balun design that renders the antenna suitable for use in a phased array communication system operating with beamforming (for example, AESAs).

Moreover, the compact design for the balun and/or antenna element are also manufacturable using printed circuit board (PCB) technologies. Accordingly, the antennas can be arranged in an array configuration desired for a particular application, such as 6G cellular. Such antennas can be used to transmit and/or receive RF signals, including millimeter wave signals.

Figure 4:
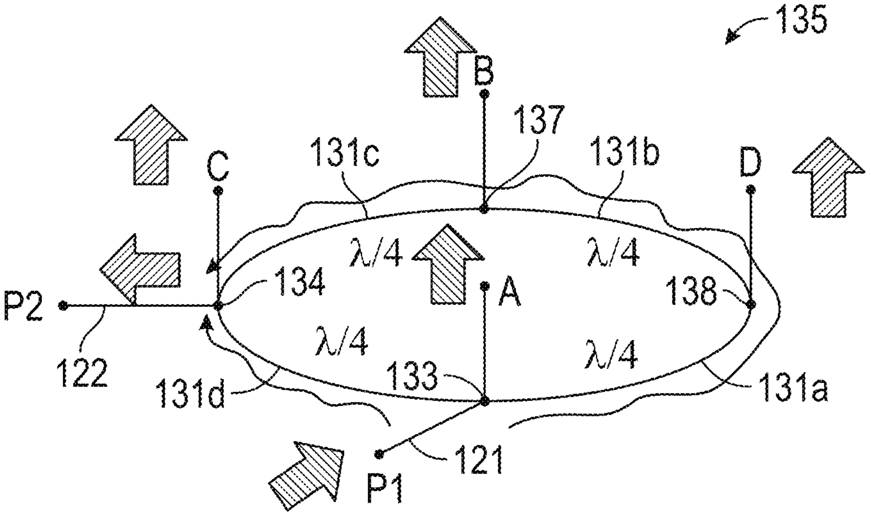
FIG. 4 is a schematic diagram of one embodiment of a ring balun for a dual-polarized antenna.

FIG. 4 is a schematic diagram of one embodiment of a ring balun 135 for a dual-polarized antenna. The ring balun 135 includes various conductive segments 131*a*-131*d* arranged in a ring. Additionally, the ring balun 135 includes a first input port 133 that receives a first single-ended RF signal of a first signal polarization P1 from a first signal feed 121, and a second input port 134 that receives a second single-ended RF signal of a second signal polarization P2 from a second signal feed 122. The ring balun 135 further includes a first output port A and a second output port B that output a first differential RF signal of the first signal polarization, and a third output port C and a fourth output port D that output a second differential RF signal of the second signal polarization.

In the illustrated embodiment, the output ports A/B/C/D provide signal components tapped from various points along the ring. For example, the first output port A provides a first signal component taken from the ring near the first input port 133, while the second output port B provides a second signal component taken from the ring near a first ring node 137 across the ring from the first input port 133. Additionally, the third output port C provides a third signal component taken from the ring near the second input port 134, while the fourth output port D provides a fourth signal component taken from the ring near a second ring node 138 across the ring from the second input port 134. Vias or other suitable conductors can be used to provide the signal components to the output ports A/B/C/D.

As shown in FIG. 4, the first segment 131*a* is connected between the first input port 133 and the second ring node 138, while the second segment 131*b* is connected between the second ring node 138 and the first ring node 137. Additionally, the third segment 131*c* is connected between the first ring node 137 and the second input port 134, while the fourth segment 131*d* is connected between the second input port 134 and the first input port 133.

In certain implementations, the first segment 131*a*, the second segment 131*b*, the third segment 131*c*, and the fourth segment 131*d* are about equal length (for example, within 20%, or more particularly, within about 10%) of one another.

By implementing the segments 131*a*-131*d* in this manner, the signal components tapped from the various points along the ring have a phase separation of about 90°. Thus, the signal components at the output ports serves to provide differential signals of proper signal polarizations.

Additionally, the phase separation between the first input port 133 and the second input port 134 provides signal cancellation and isolation between input ports 133/134. Thus, in certain implementations, the first input port 133 and the second input port 134 are angularly separated by about 90° (for example, 90°+/−20%, or more particularly, 90°+/−10%) along the ring.

In certain implementations, the first segment 131*a*, the second segment 131*b*, the third segment 131*c*, and the fourth segment 131*d* have a length that is about equal to a quarter of a wavelength (λ) of the RF signals (P1/P2), for example, λ/4+/−10%.

As shown in FIG. 4, various signal annotations are shown for the case of the first polarized signal P1 injected at the first input port 133. The signal component travelling counter-clockwise cancels with the signal component travelling clockwise at all ports except for the first output port A and the second output port B, which have about a 180° phase shift as desired. Symmetry/reciprocity apply to the second polarized signal P2 injected at the second input port 134.

Figure 5A:
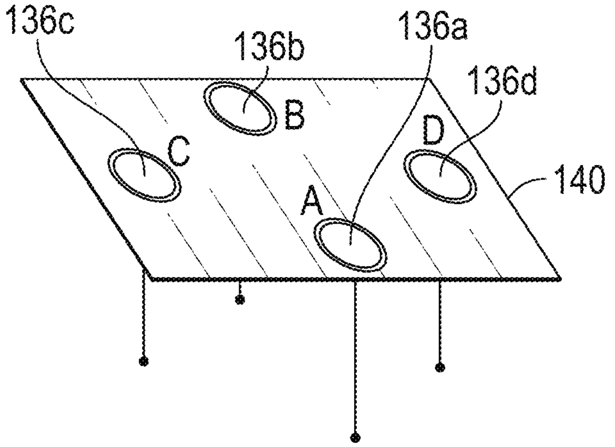
FIG. 5A is a schematic diagram of one embodiment of a patch antenna element for a dual-polarized antenna.

FIG. 5A is a schematic diagram of one embodiment of a patch antenna element 140 for a dual-polarized antenna. The patch antenna element or conductive patch 140 includes openings in which a first excitation conductor 136*a*, a second excitation conductor 136*b*, a third excitation conductor 136*c*, and a fourth excitation conductor 136*d* are formed. The excitation conductors 136*a*-136*d* are each separated from the conductive patch 140 by a gap of dielectric, such as air.

The excitation conductors 136*a*-136*d* are electrically connected to the output ports A-D, respectively, of a ring balun (not shown in FIG. 5A). For example, the ring balun 135 of FIG. 4 can be used to excite the conductive patch 140. The excitation conductors 136*a*-136*d* provide excitation by capacitive coupling (the antenna element 140 is parasitically excited) in this embodiment to prevent internal looping for the signals.

Figure 5B:
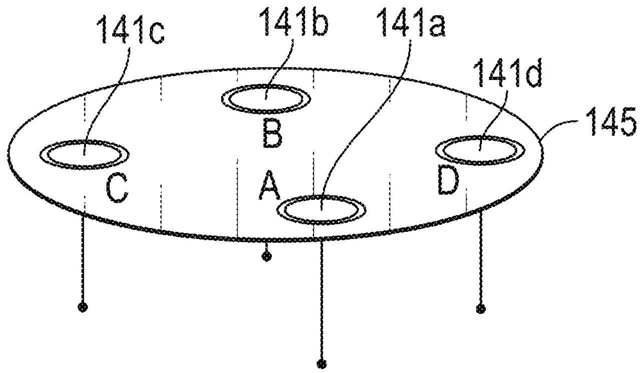
FIG. 5B is a schematic diagram of another embodiment of a patch antenna element for a dual-polarized antenna.

FIG. 5B is a schematic diagram of another embodiment of a patch antenna element 145 for a dual-polarized antenna. The patch antenna element or conductive patch 145 includes openings in which a first excitation conductor 141*a*, a second excitation conductor 141*b*, a third excitation conductor 141*c*, and a fourth excitation conductor 141*d* are formed.

The patch antenna element 145 of FIG. 5B is similar to the patch antenna element 140 of FIG. 5A, except that the patch antenna element 145 of FIG. 5B is circularly shaped rather than the square shaped as in FIG. 5A.

An antenna element can be shaped in a wide variety of ways, including, but not limited to, using rectangular (including square), circular, elliptical, hexagonal, and/or any other suitable shapes. Furthermore, although the embodiments of FIGS. 5A and 5B depict patch antenna elements, the teachings herein are applicable to other types of antenna elements that are excitable by a ring balun.

Figure 6A:
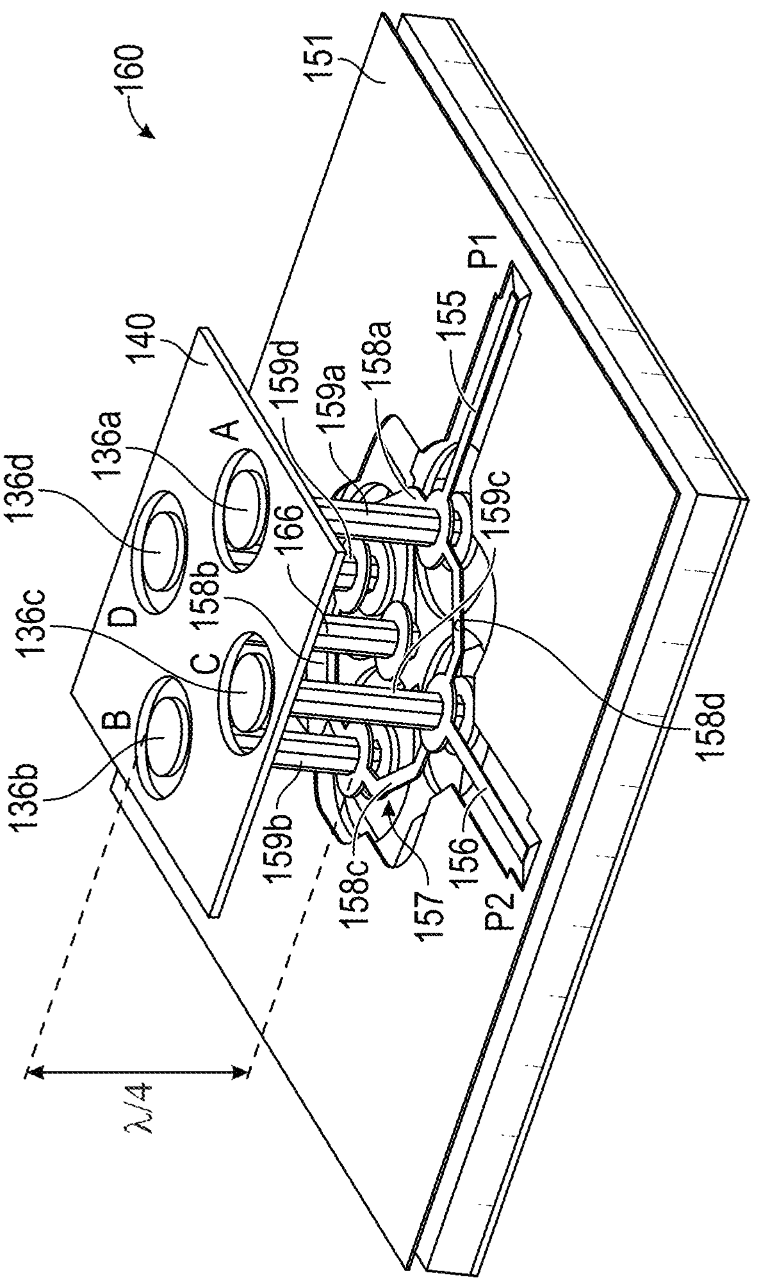
FIG. 6A is a schematic diagram of one embodiment of a dual-polarized antenna.
Figure 6B:
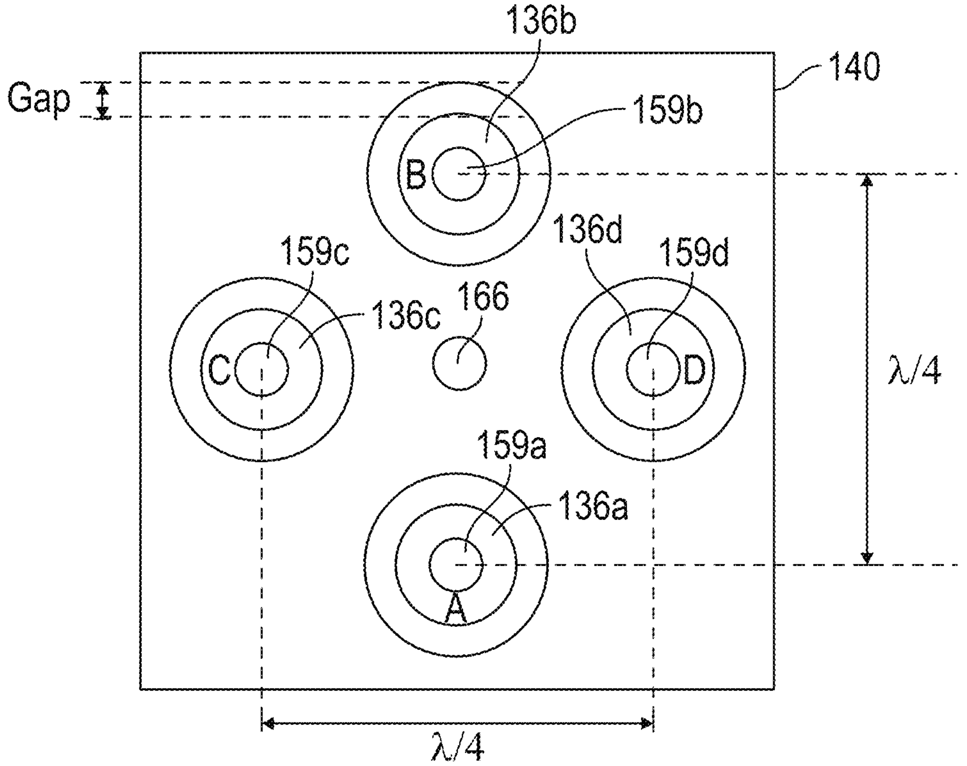
FIG. 6B is a schematic diagram showing an overhead view of the patch antenna element of the dual-polarized antenna of FIG. 6A.
Figure 6C:
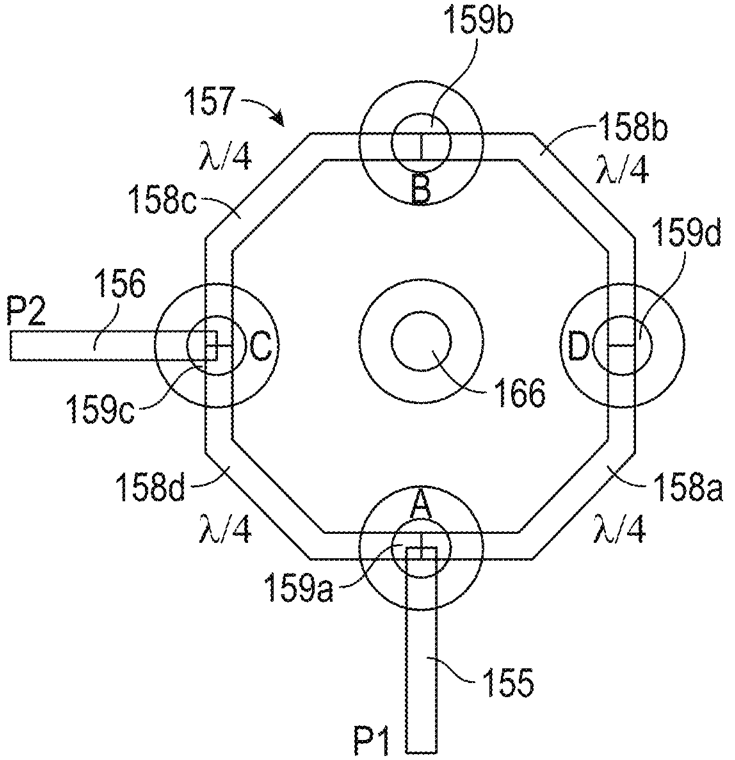
FIG. 6C is a schematic diagram showing an overhead view of the ring balun of the dual-polarized antenna of FIG. 6A.

FIG. 6A is a schematic diagram of one embodiment of a dual-polarized antenna 160. The dual-polarized antenna 160 includes a patch antenna element 140, a ground plane 151, a first input signal feed 155, a second input signal feed 156, a ring balun 157, a first signal via 159*a*, a second signal via 159*b*, a third signal via 159*c*, a fourth signal via 159*d*, and an antenna via 166. FIG. 6B is a schematic diagram showing an overhead view of the antenna element 140 of the dual-polarized antenna 160 of FIG. 6A. FIG. 6C is a schematic diagram showing an overhead view of the ring balun 157 of the dual-polarized antenna 160 of FIG. 6A.

With reference to FIGS. 6A-6C, the first input signal feed 155 receives a first polarized signal P1 (for instance, vertically polarized or RHCP polarized), while the second input signal feed 156 receives a second polarized signal P2 (for instance, horizontally polarized or LHCP polarized). The first polarized signal P1 and the second polarized signal P2 are each provided to two different points along the ring balun 157. For example, the first polarized signal P1 is provided to a first input port of the ring balun 157 near the first via 159*a*, while the second polarized signal P2 is provided to a second input port of the ring balun 157 near the third via 159*c*.

In the illustrated embodiment, a first segment 158*a* of the ring balun 157 is connected between the first via 159*a* and the fourth via 159*d*. Additionally, a second segment 158*b* of the ring balun 157 is connected between the fourth via 159*d* and the second via 159*b*, a third segment 158*c* of the ring balun 157 is connected between the second via 159*b* and the third via 159*c*, and a fourth segment 158*d* of the ring balun 157 is connected between the third via 159*c* and the first via 159*a*. One end of each of the vias 159*a*-159*d* is connected to the ring balun 157 while the other end of the vias 159*a*-159*d* is connected to excitation conductors 136*a*-136*d*, respectively.

The excitation conductors 136*a*-136*d* provide excitation by capacitive coupling (the antenna element 140 is parasitically excited) in this embodiment to prevent internal looping for the signals. As shown in FIG. 6B, a spacing from a center of the first excitation conductor 136*a* to a center of the second excitation conductor 136*b* and from a center of the third excitation conductor 136*c* to a center of the fourth excitation conductor 136*d* is about λ/4 (for instance, λ/4+/−20%).

In certain implementations, each segment 167*a*-167*d* of the ring balun 164 provides a delay of about λ/4 (for instance, λ/4+/−20%, or more particularly, λ/4+/−10%). Implementing the ring balun 164 in this manner provides signal component cancellation that aids in exciting the patch antenna element 140 with the first polarized signal P1 and the second polarized signal P2.

The ring balun 157 provides improved excitation of the patch antenna element 140 by differentially exciting the patch antenna element 140 for each of first and second signal polarizations (for instance, vertical and horizontal or RHCP and LHCP). For example, the first signal via 159*a* can carry a non-inverted component of the first polarized signal P1 while the second signal via 159*b* can carry an inverted component of the first polarized signal P1. Thus, the first signal via 159*a* and the second signal via 159*b* carry a differential representation of the first polarized signal P1 and serve to differentially excite the patch antenna element 140 at two points. Likewise, the third signal via 159*c* can carry a non-inverted component of the second polarized signal P2 while the fourth signal via 159*d* can carry an inverted component of the second polarized signal P2.

The coupling of each signal via 159*a*-159*d* to the patch antenna element 140 is by capacitive coupling (the antenna element is parasitically excited) in this embodiment to prevent internal looping for the signals.

In certain implementations, the signal vias 159*a*-159*d* and the antenna via 166 have a height of about λ/4, for instance, λ/4+/−20%, or more particularly, λ/4+/−10%. The antenna via 166 connects to a center of the patch antenna element 140, in this example.

In certain implementations, the dual-polarized antenna 160 is formed on a circuit board, such as a PCB. For example, the ground plane 151 and the patch antenna element 140 can be formed on different conductive layers of the PCB and separated from one another by dielectric. Additionally, the depicted vias can be formed through the PCB's dielectric. Thus, an antenna array including various antenna elements implemented in accordance with FIGS. 6A-6C can be formed using PCB technologies in which metallization is patterned on different conductive layers of a circuit board and interconnected by vias.

Figure 7:
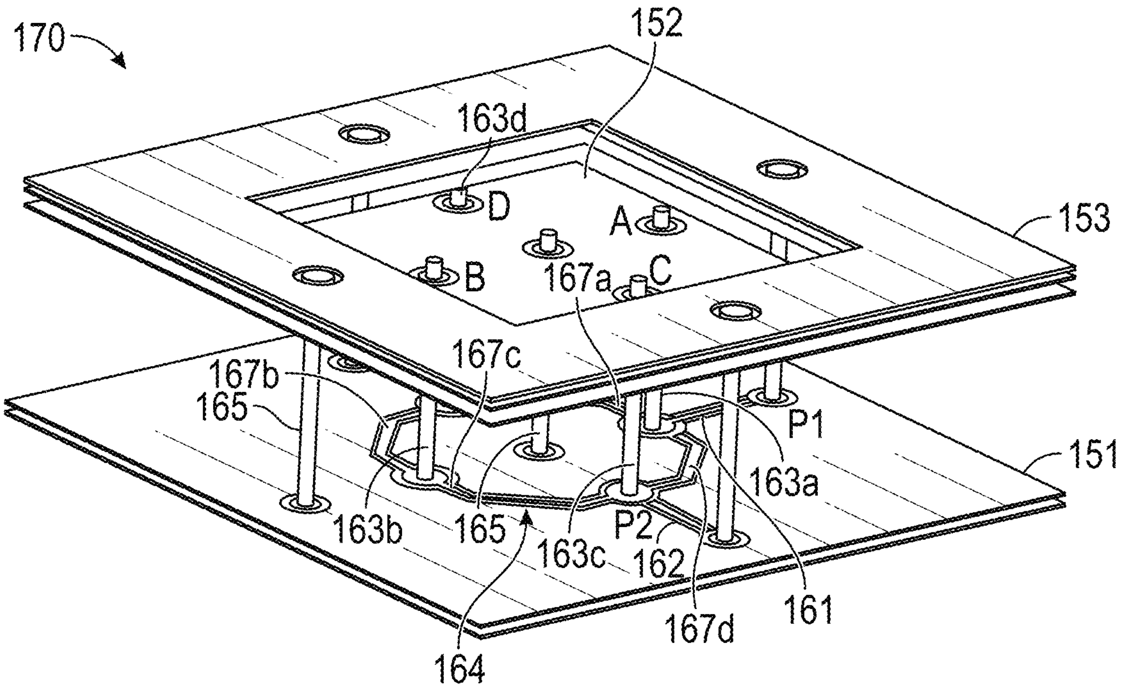
FIG. 7 is a schematic diagram of another embodiment of a dual-polarized antenna.

FIG. 7 is a schematic diagram of another embodiment of a dual-polarized antenna 170. The dual-polarized antenna 170 includes a ground plane 151, a patch antenna element 152, a shielding structure 153 (implemented as a layered metallic bounding frame, in this example), a first input signal feed 161, a second input signal feed 162, a first signal via 163*a*, a second signal via 163*b*, a third signal via 163*c*, a fourth signal via 163*d*, a ring balun 164, and parasitic monopoles 165.

The first input signal feed 161 receives a first polarized signal P1 (for instance, vertically polarized or RHCP polarized), while the second input signal feed 162 receives a second polarized signal P2 (for instance, horizontally polarized or LHCP polarized). The first polarized signal P1 and the second polarized signal P2 are each provided to two different points along the ring balun 164. For example, the first polarized signal P1 is provided to a first input port of the ring balun 164 at the first via 163*a*, while the second polarized signal P2 is provided to a second input port of the ring balun 164 at the third via 163*c*.

As shown in FIG. 7, a first segment 167*a* of the ring balun 164 is connected between the first via 163*a* and the fourth via 163*d*. Additionally, a second segment 167*b* of the ring balun 164 is connected between the fourth via 163*d* and the second via 163*b*, a third segment 167*c* of the ring balun 164 is connected between the second via 163*b* and the third via 163*c*, and a fourth segment 167*d* of the ring balun 164 is connected between the third via 163*c* and the first via 163*a*.

In certain implementations, each segment 167*a*-167*d* of the ring balun 164 provides a delay of about λ/4. Implementing the ring balun 164 in this manner provides signal component cancellation that aids in exciting the patch antenna element 152 with the first polarized signal P1 and the second polarized signal P2.

The ring balun 164 provides improved excitation of the patch antenna element 152 by differentially exciting the patch antenna element 152 for each of first and second signal polarizations (for instance, vertical and horizontal or RHCP and LHCP). For example, the first signal via 163*a* can carry a non-inverted component of the first polarized signal P1 while the second signal via 163*b* can carry an inverted component of the first polarized signal P1. Thus, the first signal via 163*a* and the second signal via 163*b* carry a differential representation of the first polarized signal P1 and serve to differentially excite the patch antenna element 152 at two points. Likewise, the third signal via 163*c* can carry a non-inverted component of the second polarized signal P2 while the fourth signal via 163*d* can carry an inverted component of the second polarized signal P2.

The coupling of each signal via 163*a*-163*d* to the patch antenna element 152 is by capacitive coupling (the antenna element is parasitically excited) in this embodiment to prevent internal looping for the signals.

In certain implementations, the signal vias 163*a*-163*d* and the parasitic monopoles 165 have a height of about λ/4.

In certain implementations, the dual-polarized antenna 170 is formed on a circuit board, such as a PCB. For example, the ground plane 151, the patch antenna element 152, and the shielding structure 153 can be formed on different conductive layers of the PCB and separated from one another by dielectric. Additionally, the depicted vias can be formed through the PCB's dielectric. Thus, an antenna array including various antenna elements implemented in accordance with FIG. 7 can be formed using PCB technologies in which metallization is patterned on different conductive layers of a circuit board and interconnected by vias.

Figure 8:
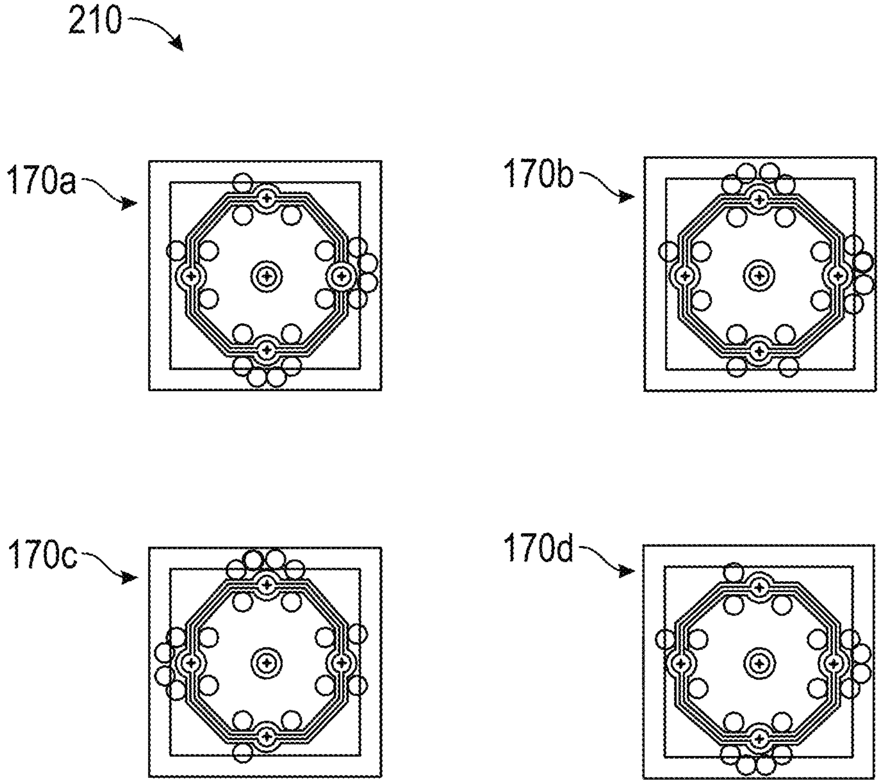
FIG. 8 is a schematic diagram of one embodiment of an antenna array of dual-polarized antennas.

FIG. 8 is a schematic diagram of one embodiment of an antenna array 210 of dual-polarized antennas. The array 210 includes a first dual-polarized antenna 170*a*, a second dual-polarized antenna 170*b*, a third dual-polarized antenna 170*c*, and a fourth dual-polarized antenna 170*d* arranged in a 2 by 2 (2×2) configuration, in this embodiment. Each of the antennas 170*a*-170*d* is implemented in accordance with the dual-polarized antenna 170 of FIG. 7, in this embodiment.

The antennas herein can be arranged in any desired array size or configuration. Such arrays can include any number of row and columns. Furthermore, the array can be uniform or non-uniformly spaced. Moreover, the antennas within the array can be rotated as desired relative to one another to achieve desired performance characteristics and/or isolation.

Figure 9A:
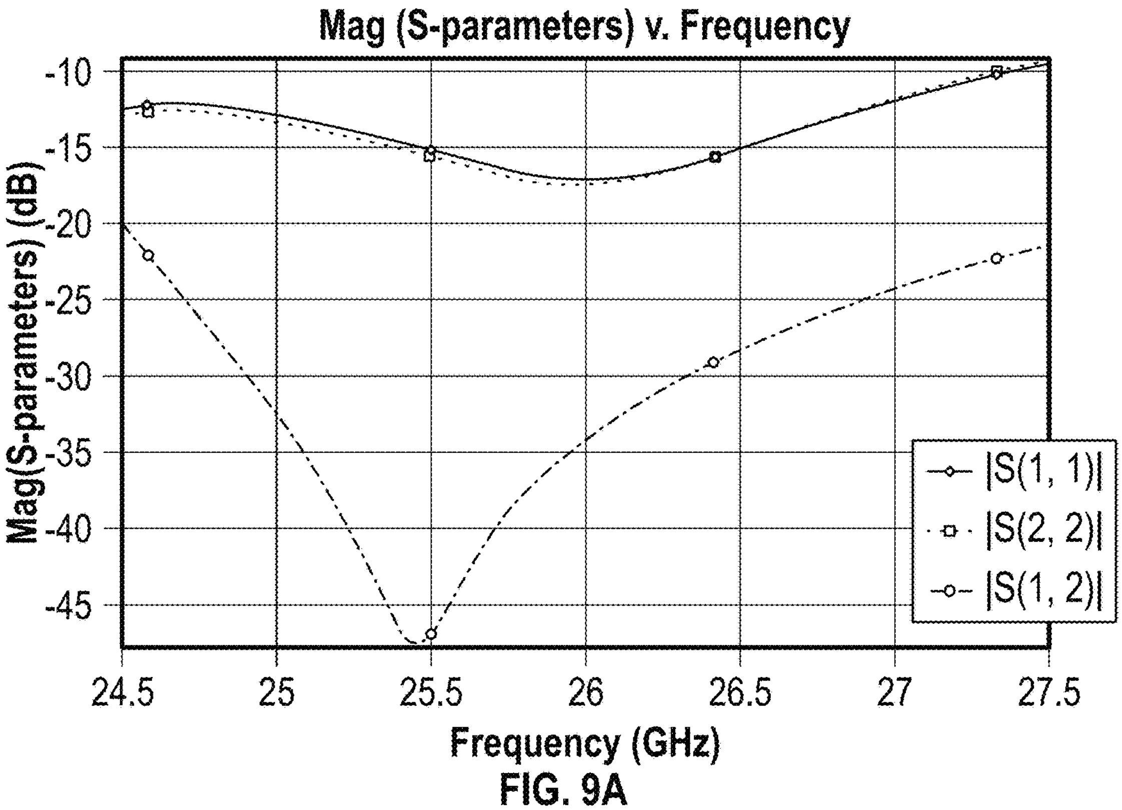
FIG. 9A is one example of a graph of magnitude versus frequency plots showing return loss and isolation for one implementation of the dual-polarized antenna of FIGS. 6A-6C.

FIG. 9A is one example of a graph of magnitude versus frequency plots showing return loss and isolation for one implementation of the dual-polarized antenna 160 of FIGS. 6A-6C.

Figure 9B:
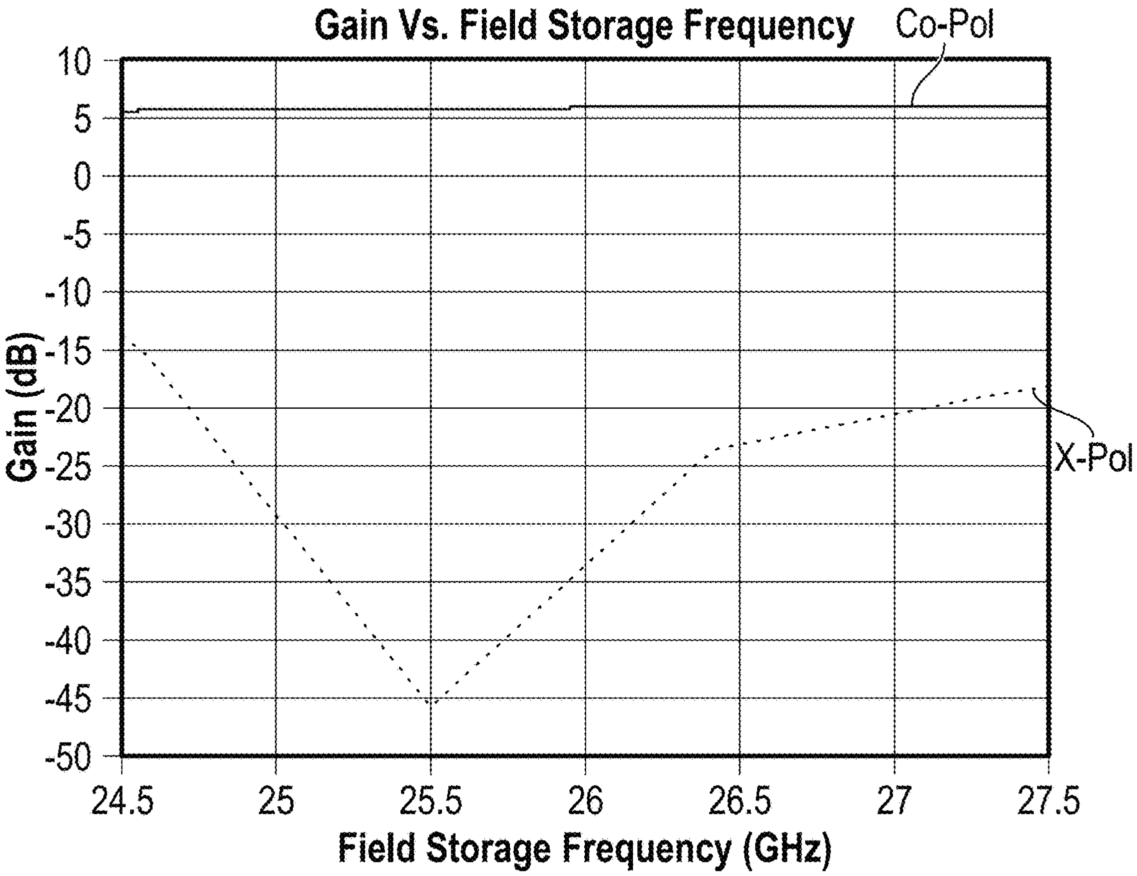
FIG. 9B is one example of a graph of broadside gain versus field storage frequency plots showing X-pol and Co-pol for one implementation of the dual-polarized antenna of FIGS. 6A-6C.

FIG. 9B is one example of a graph of broadside gain versus field storage frequency plots showing X-pol and Co-pol for one implementation of the dual-polarized antenna 160 of FIGS. 6A-6C.

Figure 9C:
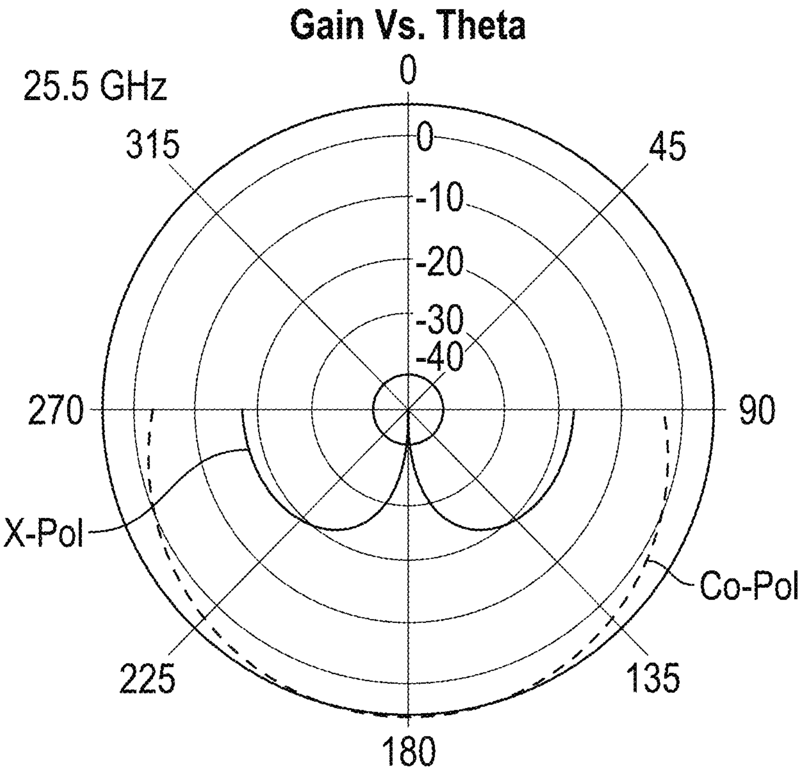
FIG. 9C is one example of a polar coordinate graph showing radiation pattern for one implementation of the dual-polarized antenna of FIGS. 6A-6C.

FIG. 9C is one example of a polar coordinate graph showing radiation pattern for one implementation of the dual-polarized antenna 160 of FIGS. 6A-6C.

As shown in FIGS. 9A-9C, the antenna array achieves good return loss, isolation, and gain along with a robust radiation pattern.

Figure 10A:
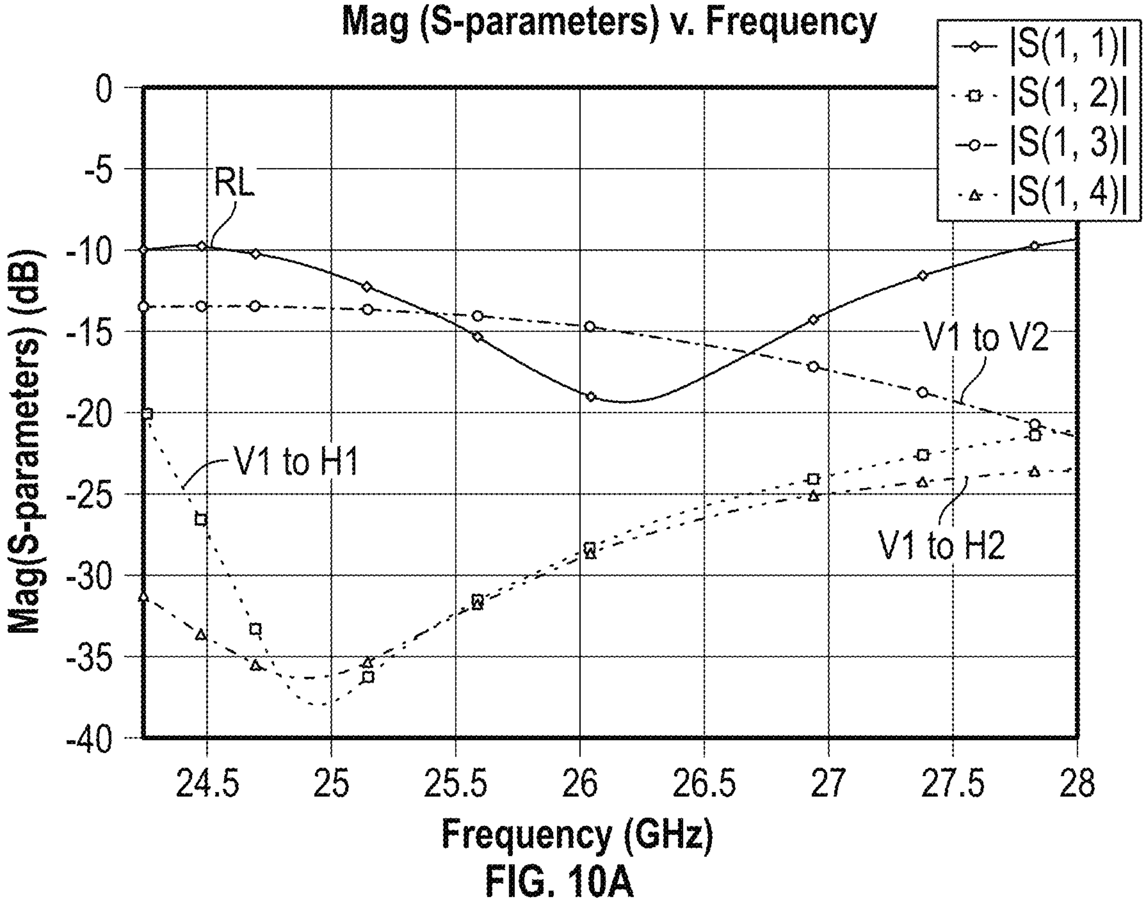
FIG. 10A is one example of a graph of magnitude versus frequency plots showing return loss and isolation for one implementation of the dual-polarized antenna of FIGS. 6A-6C implemented as a 2×2 array.

FIG. 10A is one example of a graph of magnitude versus frequency plots showing return loss and isolation for one implementation of the dual-polarized antenna 160 of FIGS. 6A-6C implemented as a 2×2 array.

Figure 10B:
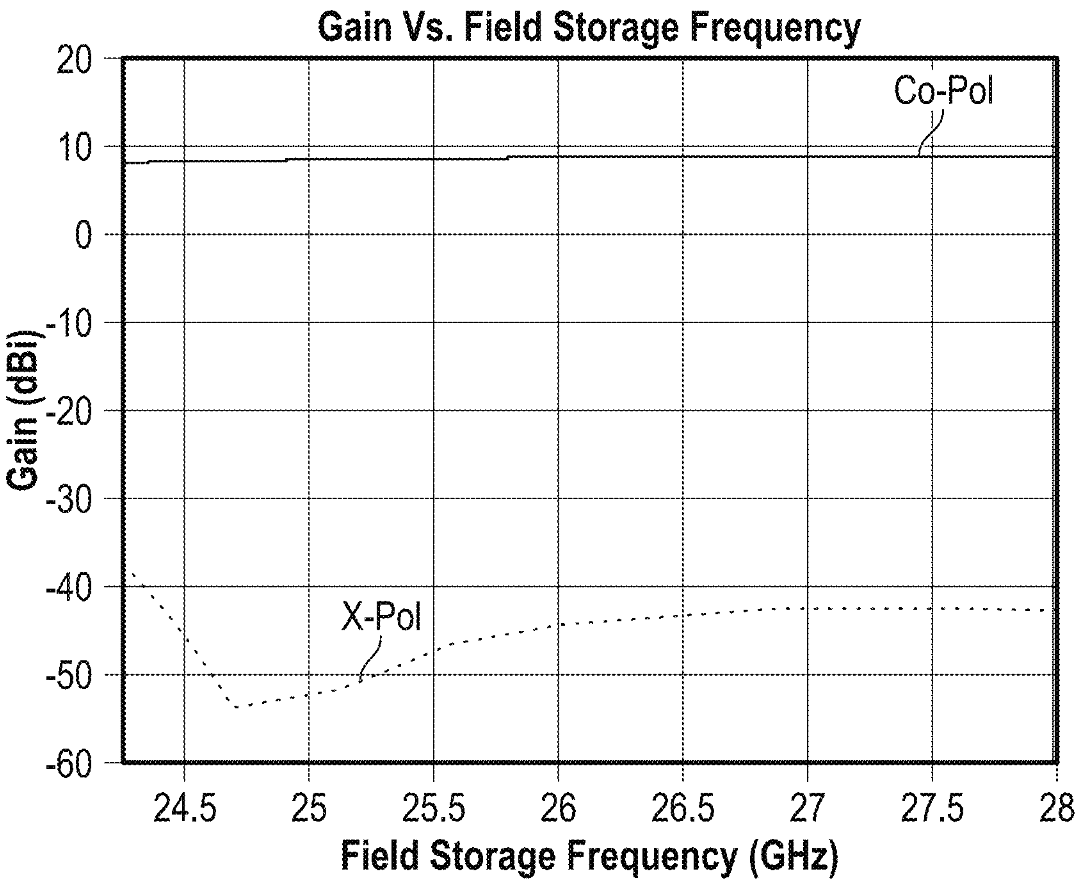
FIG. 10B is one example of a graph of broadside gain versus field storage frequency plots showing X-pol and Co-pol for one implementation of the dual-polarized antenna of FIGS. 6A-6C implemented as a 2×2 array.

FIG. 10B is one example of a graph of broadside gain versus field storage frequency plots showing X-pol and Co-pol for one implementation of the dual-polarized antenna 160 of FIGS. 6A-6C implemented as a 2×2 array.

As shown in FIGS. 10A-10B, the antenna array achieves good return loss, isolation, and gain. Moreover, isolation from neighboring X-pol ports is also achieved.

Figure 11A:
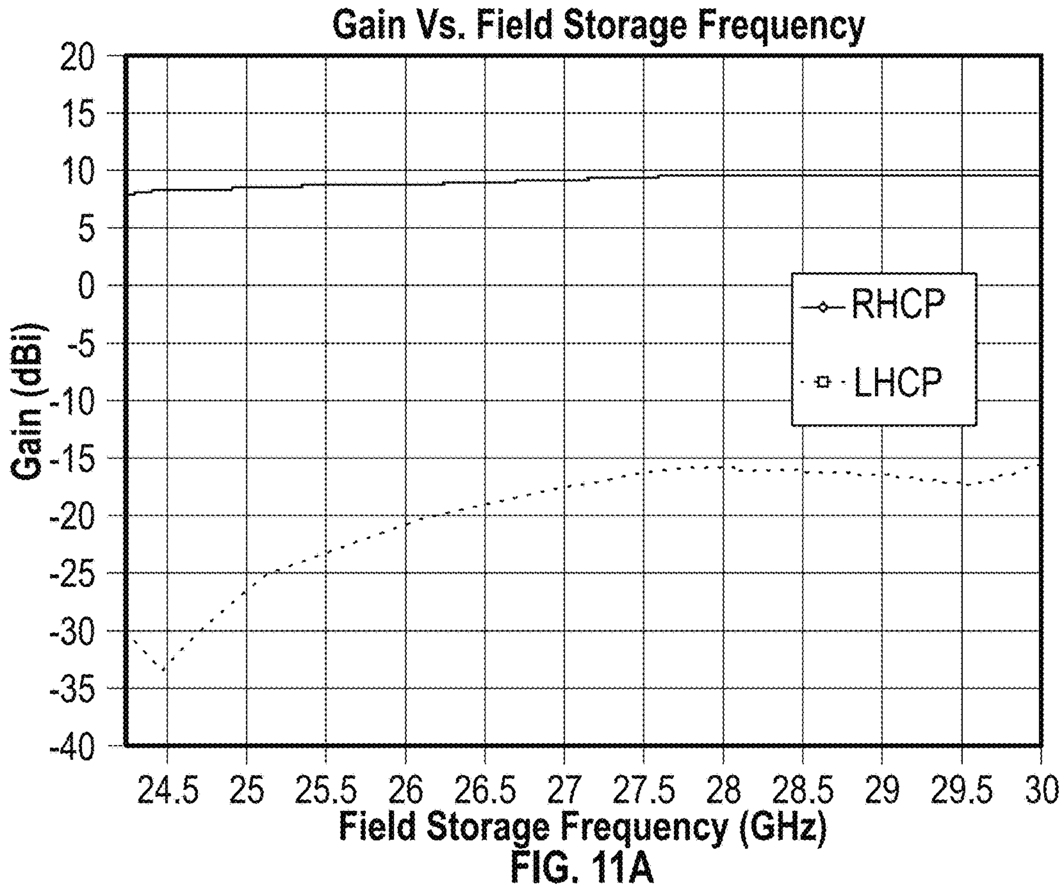
FIG. 11A is one example of a graph of broadside gain versus field storage frequency plots showing X-pol and Co-pol for one implementation of the dual-polarized antenna of FIGS. 6A-6C implemented as a circularly polarized antenna.

FIG. 11A is one example of a graph of broadside gain versus field storage frequency plots showing X-pol and Co-pol for one implementation of the dual-polarized antenna 160 of FIGS. 6A-6C implemented as a circularly polarized antenna.

Figure 11B:
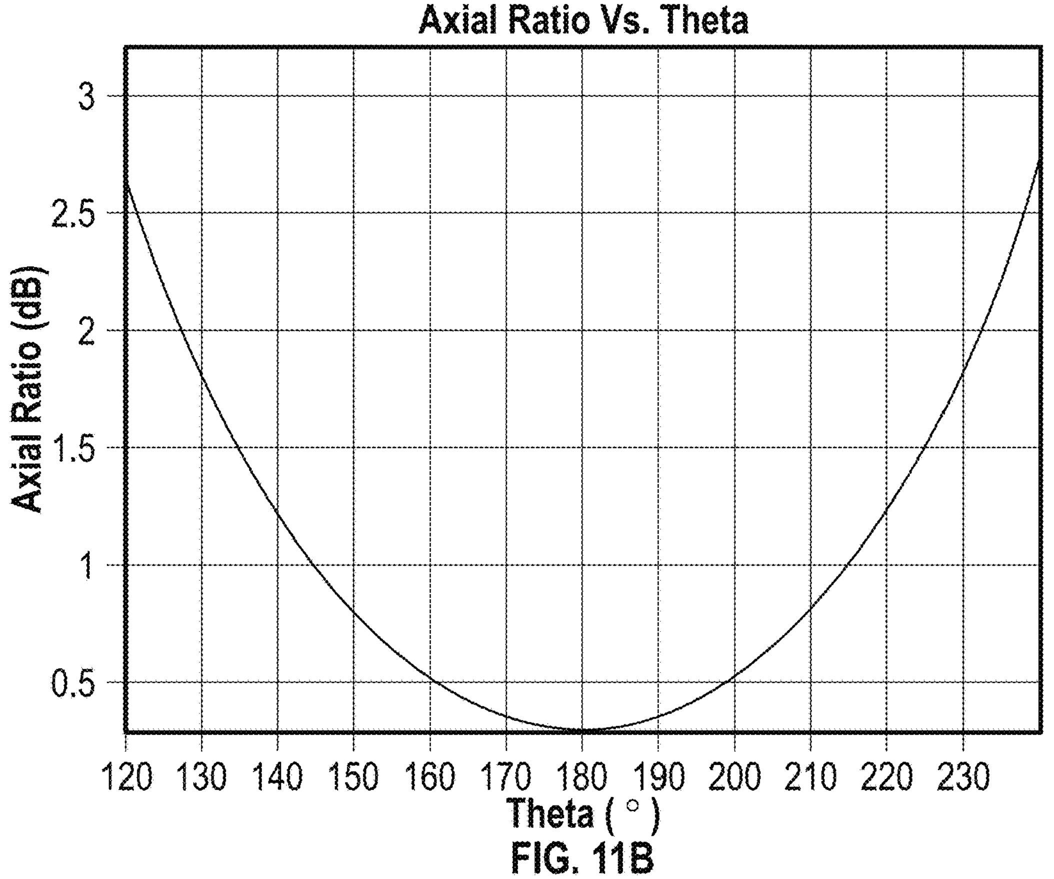
FIG. 11B is one example of a graph of axial ratio versus theta for one implementation of the dual-polarized antenna of FIGS. 6A-6C implemented as a circularly polarized antenna.

FIG. 11B is one example of a graph of axial ratio versus theta for one implementation of the dual-polarized antenna 160 of FIGS. 6A-6C implemented as a circularly polarized antenna.

With reference to FIGS. 11A-11B, a 90° phase shift was added between the two inputs signals to the antenna 160. The input signals operate with a frequency of 24.25 GHz, in this example. As shown in the graphs, the phase shift results in circular polarization radiation with a very good axial ratio with scan.

Applications

Devices employing the above-described schemes can be implemented into various electronic devices. Examples of electronic devices include, but are not limited to, RF communication systems, consumer electronic products, electronic test equipment, communication infrastructure, etc. For instance, one or more antennas can be included in a wide range of RF communication systems, including, but not limited to, radar systems, base stations, mobile devices (for instance, smartphones or handsets), phased array antenna systems, laptop computers, tablets, and/or wearable electronics.

The teachings herein are applicable to RF communication systems operating over a wide range of frequencies, including not only RF signals between 100 MHz and 7 GHz, but also to higher frequencies, such as those in the X band (about 7 GHz to 12 GHz), the Ku band (about 12 GHz to 18 GHZ), the K band (about 18 GHz to 27 GHz), the $K_a$ band (about 27 GHz to 40 GHz), the V band (about 40 GHz to 75 GHZ), and/or the W band (about 75 GHz to 110 GHz). Accordingly, the teachings herein are applicable to a wide variety of RF communication systems, including microwave communication systems.

The RF signals wirelessly communicated by the antennas herein can be associated with a variety of communication standards, including, but not limited to, Global System for Mobile Communications (GSM), Enhanced Data Rates for GSM Evolution (EDGE), Code Division Multiple Access (CDMA), wideband CDMA (W-CDMA), 3G, Long Term Evolution (LTE), 4G, 5G and/or 6G, as well as other proprietary and non-proprietary communications standards.

Conclusion

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments.

What is claimed is:

1. An antenna comprising:
- a first input signal feed configured to receive a first single-ended radio frequency (RF) signal of a first signal polarization;
- a second input signal feed configured to receive a second single-ended RF signal of a second signal polarization;
- a ring balun including a plurality of conductive segments electrically connected in a ring, the ring balun having a first input port configured to receive the first single-ended RF signal from the first input signal feed, a second input port configured to receive the second single-ended RF signal from the second input signal feed, a first output port and a second output port configured to output a first differential RF signal of the first signal polarization, and a third output port and a fourth output port configured to output a second differential RF signal of the second signal polarization; and
- an antenna element coupled to the first output port, the second output port, the third output port, and the fourth output port.

2. The antenna of claim 1, further comprising a first via connecting the first input port to the first output port, a second via connecting a first ring node of the ring balun to the second output port, a third via connecting the second input port to the third output port, and a fourth via connecting a second ring node of the ring balun to the fourth output port.

3. The antenna of claim 2, wherein the plurality of conductive segments includes a first segment connecting the first via to the fourth via, a second segment connecting the fourth via to the second via, a third segment connecting the second via to the third via, and a fourth segment connecting the fourth via to the first via.

4. The antenna of claim 3, wherein the first single-ended RF signal and the second single-ended RF signal have a wavelength, and each of the first segment, the second segment, the third segment, and the fourth segment is about a quarter of the wavelength.

5. The antenna of claim 3, wherein the first single-ended RF signal and the second single-ended RF signal have a wavelength, and a height of each of the first via, the second via, the third via, and the fourth via is about a quarter of the wavelength.

6. The antenna of claim 2, wherein the first single-ended RF signal and the second single-ended RF signal have a wavelength, and a distance between the first via and the second via and a distance between the third via and the fourth via are each about a quarter of the wavelength.

7. The antenna of claim 1, wherein the first input port and the second port have about a ninety degree separation along the ring.

8. The antenna of claim 1, wherein the first signal polarization is a vertical signal polarization, and the second signal polarization is a horizontal signal polarization.

9. The antenna of claim 1, wherein the first signal polarization is a right-hand circular polarization (RHCP) and the second polarization is a left-hand circular polarization (LHCP).

10. The antenna of claim 1, wherein the antenna element is a patch antenna element.

11. The antenna of claim 10, wherein the first output port, the second output port, the third output port, and the fourth output port capacitively feed the patch antenna element.

12. The antenna of claim 11, further comprising a plurality of parasitic monopoles coupled to the layered metallic bounding frame.

13. The antenna of claim 10, further comprising a layered metallic bounding frame surrounding the patch antenna element.

14. A printed circuit board patterned to form an antenna, the printed circuit board comprising:
- a first input signal feed formed in a first conductive layer of the printed circuit board, the first input signal feed configured to receive a first single-ended radio frequency (RF) signal of a first signal polarization;
- a second input signal feed formed in the first conductive layer of the printed circuit board, the second input signal feed configured to receive a second single-ended RF signal of a second signal polarization;
- a ring balun formed in the first conductive layer of the printed circuit board, the ring balun including a plurality of conductive segments electrically connected in a ring, the ring balun having a first input port configured to receive the first single-ended RF signal from the first input signal feed, a second input port configured to receive the second single-ended RF signal from the second input signal feed, a first output port and a second output port configured to output a first differential RF signal of the first signal polarization, and a third output port and a fourth output port configured to output a second differential RF signal of the second signal polarization; and
- an antenna element formed in a second conductive layer of the printed circuit board, the antenna element coupled to the first output port, the second output port, the third output port, and the fourth output port.

15. The printed circuit board of claim 14, further comprising a first via connecting the first input port to the first output port, a second via connecting a first ring node of the ring balun to the second output port, a third via connecting the second input port to the third output port, and a fourth via connecting a second ring node of the ring balun to the fourth output port.

16. The printed circuit board of claim 15, wherein the plurality of conductive segments includes a first segment connecting the first via to the fourth via, a second segment connecting the fourth via to the second via, a third segment connecting the second via to the third via, and a fourth segment connecting the fourth via to the first via.

17. The printed circuit board of claim 16, wherein the first single-ended RF signal and the second single-ended RF signal have a wavelength, and each of the first segment, the second segment, the third segment, and the fourth segment is about a quarter of the wavelength.

18. The printed circuit board of claim 16, wherein the first single-ended RF signal and the second single-ended RF signal have a wavelength, and a height of each of the first via, the second via, the third via, and the fourth via is about a quarter of the wavelength.

19. The printed circuit board of claim 15, wherein the first single-ended RF signal and the second single-ended RF signal have a wavelength, and a distance between the first via and the second via and a distance between the third via and the fourth via are each about a quarter of the wavelength.

20. A method of forming an antenna, the method comprising:

forming a first input signal feed in a first conductive layer of a printed circuit board, the first input signal feed configured to receive a first single-ended radio frequency (RF) signal of a first signal polarization;

forming a second input signal feed in the first conductive layer of the printed circuit board, the second input signal feed configured to receive a second single-ended RF signal of a second signal polarization;

forming a ring balun in the first conductive layer of the printed circuit board, the ring balun including a plurality of conductive segments electrically connected in a ring, the ring balun having a first input port configured to receive the first single-ended RF signal from the first input signal feed, a second input port configured to receive the second single-ended RF signal from the second input signal feed, a first output port and a second output port configured to output a first differential RF signal of the first signal polarization, and a third output port and a fourth output port configured to output a second differential RF signal of the second signal polarization; and forming an antenna element in a second conductive layer of the printed circuit board, the antenna element coupled to the first output port, the second output port, the third output port, and the fourth output port.

* * * * *